United States Patent [19]

Kobayashi

[11] Patent Number: 5,484,868

[45] Date of Patent: Jan. 16, 1996

[54] ORGANIC SILICON ALTERNATING COPOLYMER AND ITS MANUFACTURING METHOD

[75] Inventor: Hideki Kobayashi, Chiba, Japan

[73] Assignee: Dow Corning Toray Silicone Co., Ltd., Tokyo, Japan

[21] Appl. No.: 378,415

[22] Filed: Jan. 26, 1995

[30] Foreign Application Priority Data

Jan. 27, 1994 [JP] Japan .................................. 6-024777

[51] Int. Cl.⁶ .................................................. C08G 77/08
[52] U.S. Cl. ................ 528/15; 528/24; 528/25; 528/35; 556/434; 556/435
[58] Field of Search .................. 528/35, 15, 24, 528/25; 556/434, 435

[56] References Cited

U.S. PATENT DOCUMENTS

| | | | |
|---|---|---|---|
| 4,888,404 | 12/1989 | Klosowski et al. | 528/35 |
| 5,087,720 | 2/1992 | Kishita et al. | 556/434 |
| 5,117,025 | 5/1992 | Takago et al. | 556/434 |
| 5,177,131 | 7/1991 | Takago et al. | 524/100 |
| 5,239,034 | 8/1993 | Takago et al. | 528/15 |
| 5,340,899 | 8/1994 | Altes | 528/35 |
| 5,386,049 | 2/1993 | Kishita et al. | 556/434 |

OTHER PUBLICATIONS

Izvestiya Akademii Nauk SSSR, Seriya Khimicheskaya, No. 4, 739–744, Apr. 1971. Translator.

Izvestiya Akademii Nauk SSSR, Seriya Khimicheskaya, No. 6, pp. 1269–1275. Translation.

Bull. Acad. Sci USSR; Div Chem Sci, 1610–1615. Translation.

*Primary Examiner*—Melvyn I. Marquis
*Attorney, Agent, or Firm*—Alexander Weitz

[57] ABSTRACT

An organic silicon alternating copolymer which resistant to chain scission by acid or alkali is disclosed, said copolymer comprising repeat units having the formula $$\begin{array}{ccc} R^1 & R & R \\ | & | & | \\ (SiOSi & -R^2- & SiO) \\ | & | & | \\ R & R & R \end{array}$$

wherein R represents a monovalent hydrocarbon group having 1 to 10 carbon atoms and containing no aliphatic unsaturation, $R^1$ represents a fluorine atom-containing monovalent organic group having 4 to 10 carbon atoms and containing at least two groups of the formula $-CF_2-$, $R^2$ represents an alkylene group having 2 to 10 carbon atoms and said copolymer has a degree of polymerization of 1 to 10,000.

18 Claims, No Drawings

ORGANIC SILICON ALTERNATING COPOLYMER AND ITS MANUFACTURING METHOD

FIELD OF THE INVENTION

This invention concerns a type of organic silicon alternating copolymer and its manufacturing method. More specifically, this invention concerns fluorine-containing organic silicon alternating copolymer characterized by the fact that the organic silicon alternating copolymer has siloxane units and silalkylenesiloxane units bonded alternatingly in each unit.

BACKGROUND OF THE INVENTION

The organic silicon polymer having silalkylenesiloxane units represented by formula:

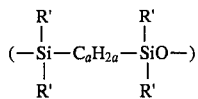

wherein R' represents a monovalent hydrocarbon group, and $a$ represents a positive integer, has a higher resistance to chain scission by acid, alkali, and other ionic substances than does a diorganopolysiloxane. Consequently, in use in special fields has been studied. For example, it has been proposed that the organic silicon copolymer made of silalkylenesiloxane units and trifluoropropylmethylsiloxane units be used as the base polymer for a high-strength silicone rubber composition (Japanese Kokai Patent Application No. Hei 4-89866). As a method for manufacturing this type of organic silicon polymer having silalkylenesiloxane units, it is proposed that cleavage polymerization be performed for the cyclic silalkylenesiloxane (Izvestiya Akademii Nauk SSSR, Seriya Khimicheskaya, No. 4, 739–744, April, 1971, Japanese Kokai Patent Application Nos. 4-65428 and Hei 4-65429).

However, for the organic silicon copolymer made of silalkylenesiloxane units and trifluoropropylmethylsiloxane units disclosed in Japanese Kokai Patent Application No. Hei 4-89866, there is no regularity in the bonds of these siloxane units, and the fluorine content is small. Consequently, it is inappropriate for applications that require good surface lubrication property, surface modification property, and oil resistance. For the manufacturing method of the organic silicon polymer disclosed in Izvestiya Akademii Nauk SSSR, Japanese Kokai Patent Application Nos. Hei 4-65428 and Hei 4-65429, it is necessary to prepare 2,2,6,6-tetramethyl-1-oxa-2,6-disilacyclohexane, or other cyclic silalkylenesiloxane beforehand. Usually, however, it is difficult to prepare the cyclic silalkylenesiloxane. This is a disadvantage. Also, as reported in Izvestiya Akademii Nauk in this method a portion of the polysilalkylenesiloxane is depolymerized and the yield of the organic silicon polymer yield decreases significantly. This is also a disadvantage.

SUMMARY OF THE INVENTION

An object of the invention is to provide a type of organic silicon alternating copolymer with siloxane units and silalkylenesiloxane units bonded alternatingly in each unit and having a large content of fluorine atoms. A further object is the disclosure of a manufacturing method for the aforementioned organic silicon alternating copolymer, said method having a high yield.

This invention thus provides a type of organic silicon alternating copolymer characterized by the fact that the main chain of the organic silicon alternating copolymer is made of repeating units represented by the following formula:

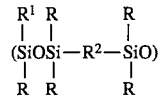

wherein R represents a $C_{1-10}$ monovalent hydrocarbon group containing no aliphatic unsaturated bond; $R^1$ represents a $C_{4-10}$ fluorine-atom-containing monovalent organic group containing two or more groups represented by $-CF_2-$; $R^2$ represents a $C_{2-10}$ alkylene.

This invention also provides a manufacturing method for the organic silicon alternating copolymer, said method comprising reacting (A) an organohydrodienetrisiloxane represented by the formula:

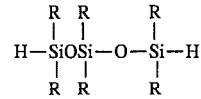

where R and $R^1$ have their previously defined meanings; and (B) an unsaturated aliphatic hydrocarbon having 3–10 carbon atoms and two carbon-carbon double bonds, or an unsaturated aliphatic hydrocarbon having 2–10 carbon atoms and one carbon-carbon triple bond;

in the presence of (C) a catalyst for hydrosilylation.

The present invention has been disclosed in Japanese Patent Application Number Hei 6-024777, the full disclosure of which is hereby incorporated by reference.

DETAILED DESCRIPTION OF THE INVENTION

According to this invention, the organic silicon alternating copolymer has a main chain made of repeating units represented by the following formula:

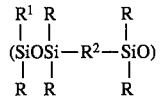

where R independently represents a $C_{1-10}$ monovalent hydrocarbon group having no aliphatic unsaturated bonds. Specific examples include methyl group, ethyl group, propyl group, butyl group, pentyl group, hexyl group, heptyl group, octyl group, nonyl group, decyl group, or other alkyl group; phenyl group, tolyl group, xylyl group, or other aryl group; benzyl group, phenethyl group, or other aralkyl group. Among them, methyl group and phenyl group are preferable. $R^1$ a represents $C_{4-10}$ fluorine-atom-containing monovalent organic group containing two or more groups represented by $-CF_2-$, such as the group represented by $-R^3-C_mF_{(2m-1)}$, where $R^3$ represents a bivalent organic group, such as ethylene group, propylons group, butylene group, pentylene group, or other alkylene group; methylene oxyethylcne group, methylene oxypropyl group, ethylene oxypropylene group, or other alkylene oxyalkylene group; phonylens ethylene group, phonylens propylons group, phenylene butylene group, or other arylene alkylene group; phonylens oxyethylene group, phonylens oxypropylene group, or other arylene oxyalkylene group. Among them, ethylene group and propylons group are preferable. In the above formula, m represents an integer in the range of 3–8. The structure of the fluorine-atom-containing monovalent organic group may be either branched, straight chain, or straight chain with a portion of a branch on the straight chain. Among these., the straight chain is preferred. $R^3$ a represents $C_{2-10}$ alkylene group, such as ethylene group, methylethylene group, ethylethylene group, propylethylene group, butylethylene group, propylene group, burylens group, 1-methylpropylene group, pentylene group, hexenylene group, heptenylene group, octenylene group, nonenylene group, decenylene group, etc. Among these, ethylene group, propylons group, butylene group, and hexenylene group are preferable. The structure of the alkylene group may be either straight chain or branched. In the alternating copolymer of the present invention the degree of polymerization is in the range of 1–10,000. The molecular structure of the organic silicon alternating copolymer of this invention is straight chain or cyolic. When the structure is a straight chain, the molecular chain terminal groups can be selected from hydrogen atom, hydroxy group, $C_{2-10}$ alkenyl group, and the monovalent hydrocarbon group represented by R explained in the above. Examples of the alkenyl groups include vinyl group, allyl group, butenyl group, pentenyl group, hexenyl group, heptenyl group, octenyl group, nonenyl group, and decenyl group. Examples of the organic silicon alternating copolymers include those with main chains made of the repeating units represented by the following formulas:

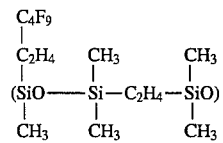

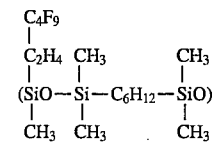

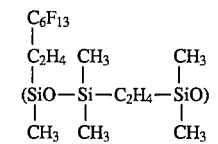

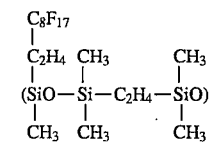

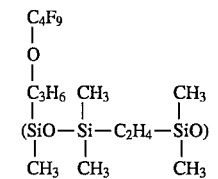

According to this invention, the organic silicon alternating copolymer is manufactured by means of addition polymerization between organohydrodienetrisiloxane (A) and unsaturated aliphatic hydrocarbon (B) in the presence of catalyst (C).

In the manufacturing method of this invention, the organohydrodienetrisiloxane (A) is represented by the following formula

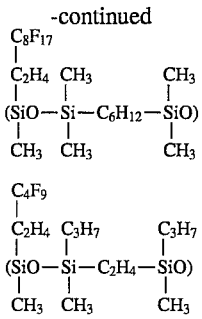

where R and $R^1$ have their previously defined meanings. The following siloxanes are examples of the above mentioned organohydrodienetrisiloxane (A):

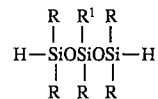

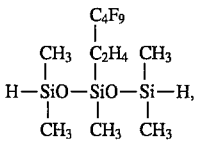

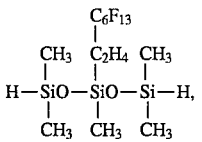

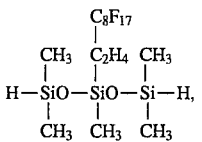

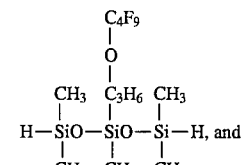

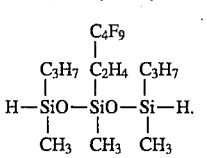

The unsaturated aliphatic hydrocarbon (B) is a component for introducing alkylene groups into the organic silicon alternating copolymer of this invention. Examples of the unsaturated aliphatic hydrocarbons having 3–10 carbon atoms and two carbon-carbon double bonds include 1,2-propadiene (known as allene), 1,3-butadiene, 2-methyl-1,3-butadiene (known as isoprene), 2,3-dimethyl-1,3-butadiene, 1,3-pentadiene, 1,4-pentadiene, 1,5-hexadiene, and 1,3-cyclohexadiene. Examples of this component having 2–10 carbon atoms and one carbon-carbon triple bond include acetylene, propyne, 1-butyne, 2-butyne, 1-pentyne, 2-pentyne, 3-methyl-1-butyne, 3,3-dimethyl-1-butyne, 1-hexyne, 2-hexyne, 1-heptyne, 1-octyne, 4-octyne, 1-nonyne, 1-decyne, 5-decyne, inter alia. In the manufacturing method of this invention, the amount of component (B) added should be appropriate to ensure that the molar ratio of component (A) to component (B) is in the range of 0.5:1.0 to 1.5:1.0. In order to prepare organic silicon alternating copolymer with a relatively high molecular weight, it is preferred for the molar ratio of component (A) to component (B) to be 1:1 exactly.

The catalyst for the hydrosilylation reaction, as component (C), is a type of catalyst which can promote the addition reaction between the hydrogen atoms bonded to silicon atoms in component (A) and the aliphatic unsaturated carbon bonds in component (B), and can thus promote the addition polymerization so as to manufacture the organic silicon alternating copolymer of this invention. Examples of component (C) include platinum catalysts, rhodium catalysts, palladium catalysts, organic peroxides, and the like. Among them, platinum catalysts that can promote the addition polymerization significantly are preferred. Examples of the preferable platinum catalysts that can be used include platinum black, platinum-carrying silica micron-sized powder, platinum-carrying carbon powder, chloroplatinic acid, alcohol solution of chloroplatinic acid, complex of platinum and vinyl siloxane, and complex of platinum and olefin. It is preferred that the amount of component (C) be in the range of 0.1–500 parts by weight with respect to 1 million parts by weight of the total amount of component (A) and component (B).

In the method of this invention, the order in which components (A)–(C) are mixed can be selected at will. For example, the mixture of components (A) and (C) is stirred with heating and component (B) is added slowly; a mixture of component (B) and component (C) is stirred with heating, while component (A) is added slowly to the mixture; a mixture of component (A) and component (B) is stirred with heating, while component (C) is added slowly to the mixture; or a mixture of components (A), (B), and (C) is heated and stirred. When component (B) is in gaseous form, it is possible to introduce component (B) in gaseous form into the mixture of components (A) and (C).

In the method of this invention, when an excess amount of component (A) is added with respect to component (B), the terminals of the molecular chains of the obtained organic silicon alternating copolymer become silicon-atom-bonded hydrogen atoms. When an excess amount of component (8) is added with respect to component (A), the terminals of the molecular chains of the obtained organic silicon alternating copolymer become alkenyl groups. In addition, when water, alcohol, or other compound having reactive hydrogen is blended in the reaction system, the terminals of the molecular chains of the obtained organic silicon alternating copolymer may become hydroxy groups.

In the method of this invention, it is possible to make use of an organic solvent as long as the purpose of this invention is not harmed. By using an organic solvent, it is possible to manufacture the organic silicon alternating copolymer with an even higher molecular weight. Examples of the organic solvents that may be used include toluene, xylene, and other aromatic hydrocarbon solvents; hexane, heptane, octane, nonane, and other aliphatic hydrocarbon solvents; cyclohexane, cycloheptane, cyclooctane, and other alicyclic hydrocarbon solvents; trifluoromethylbenzene, 1,3-bis(trifluoromethyl)benzene, methylpentafluorobenzene, and other fluorine-atom-containing aromatic hydrocarbon solvents.

There is no special limitation on the manufacturing method of this invention. When the manufacturing operation is performed under ambient pressure, the reaction temperature is in the range from room temperature to the boiling point of component (A) or component (B), or the boiling point of the organic solvent used. When the boiling point of component (B) or the boiling point of the organic solvent used is relatively low, the manufacturing operation may be performed under elevated pressure.

The organic silicon alternating copolymer of this invention is in the form of a sticky liquid at room temperature. Its surface tension is low, and it has a high resistance to scission of the molecular chains by acid, alkali, and other ionic substances. For example, it can be used as the base oil for manufacturing lubricants, defoaming agents and grease, or as an additive for hydrocarbon lubricants. In addition to these applications as an oil, it may also be used as the base polymer for the organic-peroxide-curing silicone rubber composition, addition-reaction-curing silicone rubber composition, and condensation-reaction-curing silicone rubber composition. Also, when the terminals of the molecular chains are silicon-atom bonded hydrogen atoms, it can be used as the raw material for preparing the organic silicon alternating copolymer having organic functional groups at the terminals of the molecular chains by means of the addition reaction with an alkene having organic functional groups. When the terminals of the molecular chains have alkenyl groups, it can be used as the raw material for preparing the organic silicon alternating copolymer having organic functional groups at the terminals of the molecular chains by means of the addition reaction with a hydrodiene silane having organic functional groups. When the terminals of the molecular chains have hydroxy groups, it can be used as the raw material for preparing the organic silicon alternating copolymer having organic functional groups at the terminals of the molecular chains by means of the addition reaction with halosliana or silazane having organic functional groups.

EXAMPLES

In the following, this invention will be explained in more detail with reference to application examples.

EXAMPLE 1

In a reaction container, 19.2 g (0.03 mol) of organohydrodienetrisiloxane represented by the following formula:

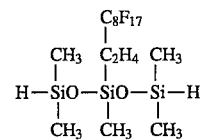

and 20 g of 1,3-bis(trifluoromethyl)benzene were loaded, followed by loading of a solution of the complex of platinum and divinyl tetramethyldisiloxane in an appropriate amount to ensure that the content of the platinum metal in the mixture was 60 ppm. while the mixture was stirred uniformly, the system was heated to 60° C. Then, while being stirred, a mixture of 2.5 g (0.03 mol) of 1,5-hexadiene and 15 g of 1,3-bis(trifluoromethyl)benzene was added dropwise at a temperature in the range of 50°–100° C. After the dropwise addition, the mixture was subjected to heating with reflux at 112° C. for 1 h. Then, the volatile component was removed by distillation under a reduced pressure, forming a sticky liquid. Analysis of the obtained sticky liquid by means of $^{13}$C-nuclear magnetic resonance spectroscopy (referred to as $^{13}$C-NMR hereinafter), $^{29}$Si-nuclear magnetic resonance spectroscopy (referred to as $^{29}$Si-NMR hereinafter), and infrared spectroscopy (referred to as IR hereinafter), verified that the obtained organic silicon alternating copolymer can be represented by the following formula:

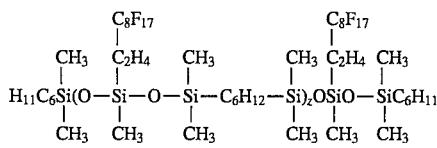

where z represents an integer 1 or larger.

Analysis of the obtained organic silicon alternating copolymer by means of gel permeation chromatography (referred to as GPC hereinafter) indicated that the weight-average molecular weight was 8,000 in equivalent units to polydimethylsiloxane. The yield of the organic silicon alternating copolymer derived from the peak area was 93%.

EXAMPLE 2

In a reaction container, 19.2 g (0.03 mol) of organohydrodienetrisiloxane represented by the following formula:

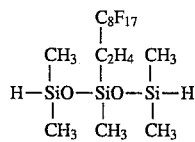

and 20 g of 1,3-bis(trifluoromethyl)benzene were loaded, followed by loading of a solution of the complex of platinum and divinyl tetramethyldisiloxane in an appropriate amount to ensure that the content of the platinum metal itself in the mixture was 60 ppm. While the mixture was stirred uniformly, the system was heated to 60° C. Then, while being stirred, acetylene gas was fed into this mixture system for 3 h. During this process, the temperature of the mixture was raised to 70° C. It was observed that the viscosity of this mixture increased. After the end of feeding, the mixture was further heated at reflux for 2 h. Then, the volatile component and solvent were removed by distillation under a reduced pressure, forming a sticky liquid. Analysis of the obtained sticky liquid by means of $^{13}$C-NMR, $^{29}$Si-NMR, and IR verified that the obtained organic silicon alternating copolymer can be represented by the following formula:

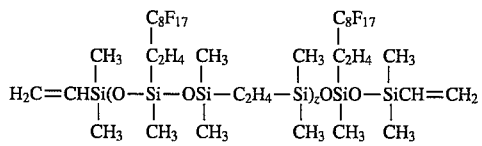

where z represents an integer 1 or larger.

Analysis of the obtained organic silicon alternating copolymer by means of GPC indicated that the weight-average molecular weight was 7,000 in equivalent units to polydimethylsiloxane. The yield of the organic silicon alternating copolymer derived from the peak area was 95%.

EXAMPLE 3

In a reaction container, 88 g (0.2 mol) of organohydrodiene-trisiloxane represented by the following formula:

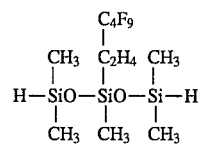

and 50 g of 1,3-bis(trifluoromethyl)benzene were loaded, followed by loading of a solution to the complex of platinum and divinyl tetramethyldisiloxane in an appropriate amount to ensure that the content of the platinum metal itself in the mixture was 100 ppm. While the mixture was stirred uniformly, the system was heated to 60° C. Then, while being stirred, a mixture of 16.4 9 (0.2 mol) of 1,5-hexadiene and 15 9 of 1,3-bis(trifluoromethyl)benzene was added dropwise an a temperature in the range of 50°–90° C. After the end of the dropwise addition, the mixture was heated at reflux at 112° C. for 1 h. Then, the volatile component was removed by distillation under a reduced pressure, forming a sticky liquid. Analysis of the obtained sticky liquid by means of $^{13}$C-NMR, $^{29}$Si-NMR, and IR verified that the obtained organic silicon alternating copolymer can be represented by the following formula:

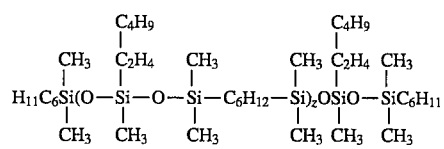

where z represents an integer of 1 or larger.

Analysis of the obtained organic silicon alternating copolymer by means of GPC indicated that the weight-average molecular weight was 12,000 in equivalent units to polydimethylsiloxane. The yield of the organic silicon alternating copolymer derived from the peak area was 94%.

That which is claimed is:

1. An organic silicon alternating copolymer comprising repeat units having the formula

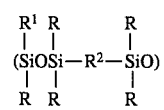

wherein R represents a monovalent hydrocarbon group having 1 to 10 carbon atoms and containing no aliphatic unsaturation, $R^1$ represents a fluorine atom-containing monovalent organic group having 4 to 10 carbon atoms and containing at least two groups of the formula -$CF_2$-, $R^2$ represents an alkylene group having 2 to 10 carbon atoms and said copolymer has a degree of polymerization of 1 to 10,000.

2. The organic silicon alternating copolymer according to claim 1, wherein R is selected from the group consisting of methyl radical and phenyl radical.

3. The organic silicon alternating copolymer according to claim 2, wherein $R^1$ has the formula $-R^3-C_mF_{(2m+1)}$ in which $R^3$ represents a bivalent organic group and m is an integer having a value of 3 to 8.

4. The organic silicon alternating copolymer according to claim 3, wherein $R^3$ is selected from the group consisting of ethylene group and propylene group.

5. The organic silicon alternating copolymer according to claim 4, wherein $R^2$ is selected from the group consisting of ethylene group, propylene group, burylens group and hexenylene group.

6. The organic silicon alternating copolymer according to claim 5, wherein R is methyl radical.

7. The organic silicon alternating copolymer according to claim 1, wherein $R^1$ has the formula $-R^3-C_mF_{(2m+1)}$ in which $R^3$ represents a bivalent organic group and m is an integer having a value of 3 to 8.

8. The organic silicon alternating copolymer according to claim 7, wherein $R^3$ is selected from the group consisting of ethylene group and propylene group.

9. The organic silicon alternating copolymer according to claim 8, wherein $R^2$ is selected from the group consisting of ethylene group, propylene group, burylens group and hexenylene group.

10. The organic silicon alternating copolymer according to claim 9, wherein R is methyl radical.

11. The organic silicon alternating copolymer according to claim 1 having repeat units of the structure

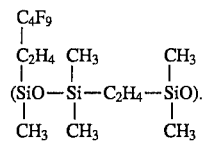

12. The organic silicon alternating copolymer according to claim 1 having repeat units of the structure

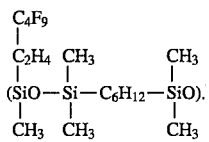

13. The organic silicon alternating copolymer according to claim 1 having repeat units of the structure

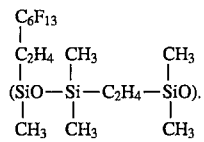

14. The organic silicon alternating copolymer according to claim 1 having repeat units of the structure

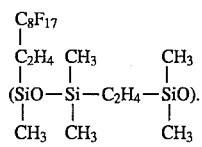

15. The organic silicon alternating copolymer according to claim 1 having repeat units of the structure

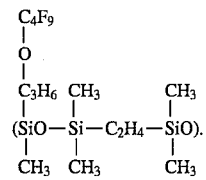

16. The organic silicon alternating copolymer according to claim 1 having repeat units of the structure

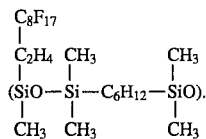

17. The organic silicon alternating copolymer according to claim 1 having repeat units of the structure

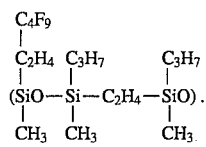

18. A method for preparing an organic silicon alternating copolymer, said method comprising reacting (A) an organohydrodienetrisiloxane having the formula

wherein R represents a monovalent hydrocarbon group having 1 to 10 carbon atoms and containing no aliphatic unsaturation and $R^1$ represents a fluorine atom-containing monovalent organic group having 4 to 10 carbon atoms and containing at least two groups of the formula $-CF_2-$; and (B) a compound selected from the group consisting of an unsaturated aliphatic hydrocarbon having 3–10 carbon atoms and two carbon-carbon double bonds and an unsaturated aliphatic hydrocarbon having 2–10 carbon atoms and one carbon-carbon triple bond, said reaction being carried out in the presence of (C) a hydrosilylation catalyst.

* * * * *